Figure 1:
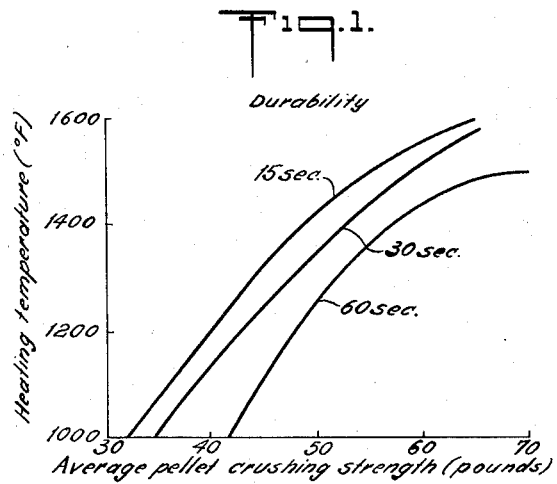

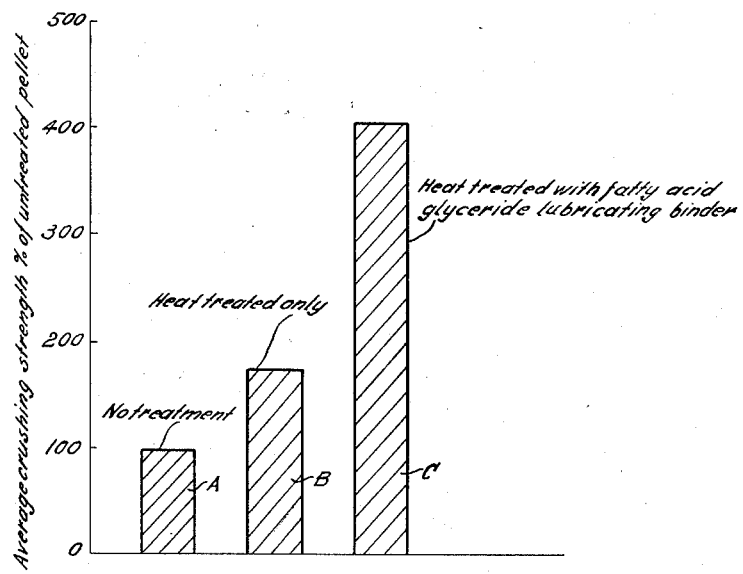
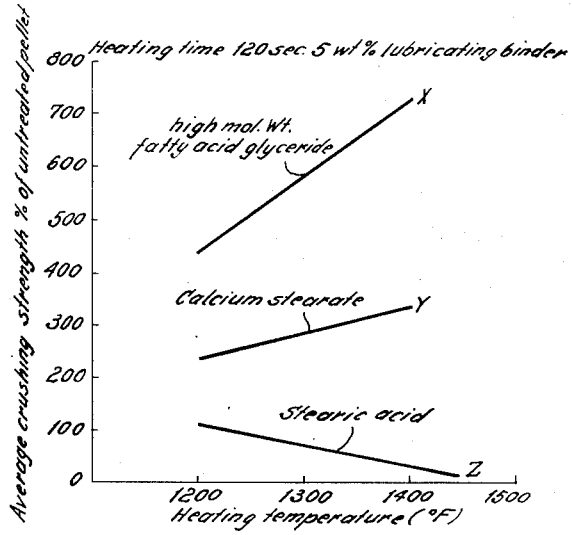
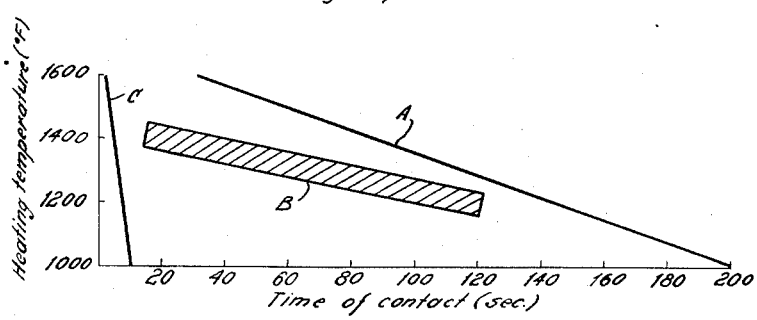

United States Patent Office 2,947,709
Patented Aug. 2, 1960

2,947,709

STABILIZED SORPTIVE ALUMINO-SILICATE PARTICLES AND PROCESS THEREFOR

Watson A. Ray, Rock Tavern, N.Y., assignor to Texaco Inc., a corporation of Delaware Filed July 20, 1956, Ser. No. 599,231

14 Claims. (Cl. 252—455)

This invention relates to durable sorptive alumino-silicate particles and process for making same. For convenience herein the process of rendering the alumino-silicate particles durable is called a stabilizing treatment, and the product of the treatment is called a stabilized particle, e.g. one having greater resistance to crushing than a corresponding untreated particle.

Heretofore alumino-silicate particles have been found to be stabilized by a process of calcining agglomerated smaller particles which have been impregnated with a metalliferous reforming catalyst-providing dispersion, as is disclosed in the copending U.S. patent application of Riordan et al., filed on November 1, 1955, assigned to The Texas Company, Serial No. 544,244. In the copending U.S. patent application of Hess et al., Serial No. 544,185, filed on November 1, 1955, now U.S. Patent No. 2,885,368 also assigned to The Texas Company, there is disclosed another process for stabilizing alumino-silicate particles, namely by coating them with a poly-hydrated compound of a metal of groups 1–4 of the periodic table, then calcining the coated particles.

I have now found, surprisingly, that a sorptive alumino-silicate particle can be made much more resistant to crushing than a corresponding untreated particle, or a particle subjected to either of the foregoing treatments, by the process which comprises contacting the particle for a period of time not substantially in excess of about 200 seconds with a heating medium maintained in the range of about 1000° to about 1700° F., said medium being substantially inert towards and incompatible with said particle, and thereafter recovering said particle having significantly increased durability and no substantial impairment of sorptive activity. The so-treated particle can then be treated with a metalliferous material to make a catalyst such as a reforming catalyst, if desired.

The heating medium should be one amenable to easy temperature control in the temperature range specified, and it should not react with the alumino-silicate surface to any apparent extent. Thus, certain fused salts, acids, and alkalis such as molten caustic soda, sodium phosphate or sulfuric acid, while meeting the temperature control conditions, would be apt to react with and impair the properties of the sorptive particles. Such materials would not be inert for purposes of my process.

Materials such as diphenyl or Dowtherm (under pressure) and the like would also be unsatisfactory in that they tend to leave adherent deposits which can impair the sorptive qualities of the resulting particle and which are not easily and completely separable by simple physical means from the particle after treatment. Broadly, such organic heating mediums and certain fused salts tending to wet the surface of the particles are not "incompatible" with the particles in the sense I use the term and, therefore, not within the purview of my process.

The preferred and outstanding heating mediums for use in my process are molten metals and alloys, e.g. molten aluminum, tin, lead, cadmium, zinc, 70–30 magnalium, woods metal, tin-lead solders, rose metal, gallium, mercury (under pressure), white metal, and the like. Most highly preferred are those low-cost ones melting below 1000° F., e.g. plumber's solder. These have good heat conductivity, the temperature and contact time can be controlled well for my type of processing, and they are physically completely separable from the treated particle with ease as they do not apparently wet the particle nor are they sorbed thereby. The contacting can be done batchwise or continuously by pouring the medium over the particles or by immersing the particles into a bath of the medium. In the dense medium they can be floated upwards therethrough.

The alumino-silicates especially amenable to my treatment can be carefully dehydrated natural or synthetic zeolitic-type minerals such as sodium alumino-silicate, sodium calcium alumino-silicate, calcium alumino-silicate, potassium alumino-silicate, cadmium alumino-silicate, strontium alumino-silicate, copper alumino-silicate, zinc alumino-silicate, cobalt alumino-silicate, iron alumino-silicate, silver alumino-silicate, nickel alumino-silicate, mixed alumino-silicates, and naturally occurring or synthetically prepared phacolite, gmelinite, harmotome, analcite, chabazite, and the like, or various base exchange modifications of these zeolites. Some of them, e.g., a sodium calcium alumino-silicate such as the one manufactured by Linde Air Products Co. and designated in the trade as Linde 5A Molecular Sieve, are useful as sorbents for dehydration, e.g. of gas streams. When treated according to the principles of my invention the alumino-silicate is strongly resistant to the deteriorative effects of water.

The particular sorptive qualities and selectivity of the alumino-silicate is affected by the effective pore size and the uniformity of such pore size. Thus the 5A Molecular Sieve, nominally designated a calcium alumino-silicate and apparently actually a sodium calcium alumino silicate $(0.75 \text{ Ca}, 0.25 \text{ Na}_2)\text{O} \cdot \text{Al}_2\text{O}_3 \cdot 2\text{SiO}_2 \cdot 4\text{–}5 \text{ H}_2\text{O}$, has an effective pore size or diameter of about 5 Angstrom units. such pore size being sufficiently large to admit straight chain hydrocarbons such as the normal paraffins and normal olefins to the substantial exclusion of the non-straight chain naphthenic, aromatic, isoparaffinic, and iso-olefinic hydrocarbons. This particular mineral sorbent is available in various sizes, e.g. a finely divided powder having a particle size in the range of 0.5–5.0 microns, exhibiting a bulk density in pounds per cubic feet of 33, and a particle density in grams per cc. of 1.6. Another form of this selective mineral sorbent is a multiplicity of the powder particles agglomerated and extruded in cylindrical form and cut into short lengths. Still another form is a multiplicity of the powder particles agglomerated into irregular larger particles of 14–30 mesh size.

Another particular selective mineral sorbent is a synthetic sodium alumino-silicate, comprising crystals having an effective pore size or diameter of about 4 Angstrom units. It is suitable for separating lower molecular weight straight chain hydrocarbons such as methane, ethane, and propane from higher molecular weight hydrocarbons and/or hydrogen by selective sorption of the lower hydrocarbon. The suitable solid selectively sorptive alumino-silicates, when carefully dehydrated, may be broadly described as crystalline zeolites having a rigid 3-dimensional anionic network and having interstitial dimensions sufficiently large to sorb straight chain hydrocarbons, but sufficiently small to exclude non-straight chain hydrocarbons possessing larger molecular dimensions. Ordinarily the preferred sorptive alumino-silicates have effective pore diameter between above 3 and 13 Angstrom units, e.g. ranging from a synthetic potassium alumino-silicate having pore diameter of 3 Angstrom units up to a synthetic sodium alumino-silicate having pore diameter of about 13 Angstrom units.

By a straight chain hydrocarbon is meant any aliphatic or acyclic or open chain hydrocarbon which does not possess side chain branching. Representative straight chain hydrocarbons are the normal paraffinic and the normal olefinic, mono or polyolefins, or straight chain acetylenic hydrocarbons. The non-straight chain hydrocarbons comprise the aromatic and naphthenic hydrocarbons as well as the isoparaffinic and isoolefinic hydrocarbons, and the like. Straight chain hydrocarbon-containing mixtures which are amenable to treatment with the durable sorbent particles of my invention include normal alkane-isoalkane mixtures and the various petroleum fractions such as a naphtha fraction, a gasoline fraction, a diesel oil fraction, a kerosine fraction, a gas oil fraction, a lubricating oil fraction, and the like. Particularly suitable straight chain hydrocarbon-containing fractions for selective sorption treatment with my durable sorbents have boiling point or boiling range in the range of about 40° to about 550° F. and contain a substantial amount of straight chain hydrocarbons, e.g. 2–35% by volume.

More particularly, a petroleum fraction suitable for use with my sorbents could have an initial boiling point in the range of 40–300° F. and an end point in the range of 150–550° F. Such petroleum fraction must contain both straight chain and non-straight chain hydrocarbons as demonstrated by the following composition:

| Hydrocarbon type: | Percent by volume |
| --- | --- |
| Naphthenes | 0–75 |
| Aromatics | 0–50 |
| Acyclic saturates (including normal paraffins and isoparaffins) | 2–90 |
| Acyclic unsaturates (including normal olefins and isoolefins) | 0–50 |

Typical refinery stocks or fractions useful for treatment with my rugged sorbent particles are normal butane-isobutane mixtures, a wide boiling straight run naphtha, a light straight run naphtha, a heavy straight run naphtha, a catalytically cracked naphtha, a thermally cracked or thermally reformed naphtha, a catalytically reformed naphtha or selected fraction thereof, and the like.

The sorptive alumino-silicates, perhaps because of their porous structure, are quite fragile. Pelleted or otherwise agglomerated alumino-silicate fines tend to reduce to an impalpable powder simply upon being rubbed together or being squeezed in the hand. As the sorptive capacity of these mineral sorbents for straight chain hydrocarbons is only about 5% to about 20% of the dry weight of the sorbent particles, and as the cost of the particles is comparatively high, it is important that the sorbent be stabilized for durability so that it can be used over and over again, particularly in moving or fluidized bed systems, thereby enabling one to maintain a relatively low inventory of sorbent per unit weight or volume of materials being treated therewith, e.g. hydrocarbons. Conventional alumino-silicates are either too fine or too fragile when agglomerated to be used in moving or fluidized bed systems without entailing heavy attrition and losses to gas vents.

The drawings are graphical representations of experimental data I have compiled on heat treating of alumino-silicate particles and will be discussed hereinafter.

Temperature of the heating medium for use in the process should be at least about 1000° F. to have any appreciable effect on the hardness of the alumino-silicate particle; above about 1700° F., time of contact is too short to be controlled easily enough and the sorptive quality of the pellets is impaired by even as much as 10–15 seconds at such temperature. The time of contact should be generally not substantially in excess of 200 seconds in my treatment and is reduced as the temperature utilized for the treatment is raised from 1000° to 1700° F. Also, very small particles, e.g. 1/32″ diameter or smaller, are more sensitive to impairment of sorptive capacity for the same contact time at a particular temperature than are larger corresponding particles; accordingly, heat treating of such smaller particles should be done faster and at a somewhat lower temperature than used for larger particles of the same material to achieve optimum results. Advantageously, the time of contact is regulated and the temperature of the heating medium is regulated in substantially inverse relationship between a minimum of about 10 seconds and a maximum of about 200 seconds for a temperature of 1000° F., and a minimum of about 2 seconds and a maximum of about 30 seconds for a temperature of 1600° F. These broad limits are depicted graphically as the zone lying between lines A and C in Fig. 6. For optimum hardness coupled with excellent and, in fact, usually improved sorptive capacity over corresponding untreated alumino-silicate particles, I prefer to regulate temperature between 1200° and 1400° F., and to maintain the time of contact substantially inversely proportional to this regulated temperature, the time of contact being about 120 seconds at 1200° F. and going down to about 15 seconds at 1400° F. This operational range is graphically depicted by Zone B in Fig. 6.

A particularly important aspect of my invention is the utilization of a lubricating binder such as a higher fatty acid (a $C_{10}$ to $C_{30}$ acid) glyceride, a higher fatty acid salt, e. g. calcium stearate or aluminum stearate, higher fatty acid esters made with mono- or polybasic alcohols, or the like in the proportions of about 3 to about 8 weight percent lubricating binder and 97–92 weight, percent fine alumino-silicate particles. The fine particles, preferably dry to the touch, and lubricating binder are intimately and substantially uniformly mixed, then agglomerated with pressure into particles of substantially larger size than the original fine particles. The larger particles can be crushed and classified to desired size ranges, e.g. 100–300 mesh (U.S. Standard) for subsequent use in fluidized bed operation. Alternatively, cylindrical pellets or beads of 1/16 inch to about 5/8 inch size can be made for fixed bed operation. Spheres or beads in this size range appear to be the most suitable for a moving bed operation where the alumino-silicate particles are in motion, but not in a fluidized state.

The agglomeration of the fine particles with the binder can be done in any conventional way, e.g. by pelleting or tableting, by extruding through a die whereafter the extruded material is cut into convenient lengths, or by a combination of such techniques. The agglomerated particles, optionally reduced to desired size or left intact, are then contacted with a heating medium such as molten solder in accordance with the time and temperature limitations hereinbefore discussed, then recovered, e.g., by simple physical separation from the medium. The agglomerated particles should not be calcined before contacting with the heating medium to achieve optimum results of hardness and sorptive activity. Residual lubricating binder can be removed from the recovered particles by extracting with solvent or by calcining them in air at temperatures of 800°–1000° F., preferably at about 900° F., to condition them for sorption of hydrocarbons. Prior to molten metal treatment the particles can be stored in air without special regard to water vapor pickup or the like.

Figure 4 shows the comparative average crushing strengths of 5/32″ diameter x 5/32″ high pellets of fine sodium calcium alumino-silicate particles. Column A shows the result of simply pelleting the fine pellets and then calcining the pellets at 900° F. The average crushing strength of these pellets is taken as the reference strength. Column B shows the average crushing strength of the same kind of pellets further contacted for 30 seconds at temperature of 1200° F. with molten solder in accordance with the principles of my invention; the average crushing strength of the so-treated pellets is 175% of the corresponding reference pellets. (Incidentally, the sorptive capacity of the pellets represented by column B is 48 cc. of normal butane per gram of pellet as compared to 41 cc. per gram with the reference pellet.) Column C shows dramatically how the use of a lubricating binder plus the heat treatment increases the crushing strength of the resulting particle. Here the fine particles were first compounded with 5% by weight Sterotex (the trade-name for a hydrogenated vegetable fat made by the Capitol City Products Company), then pelleted in the same way as the reference pellets, and subsequently immersed in molten 50/50 tin-lead solder for 30 seconds at 1200° F. They had more than four times the crushing strength of the reference pelleted alumina-silicate, and incidentally, a shade more n-butane sorption capacity than the pellets represented by column B.

Figure 3:
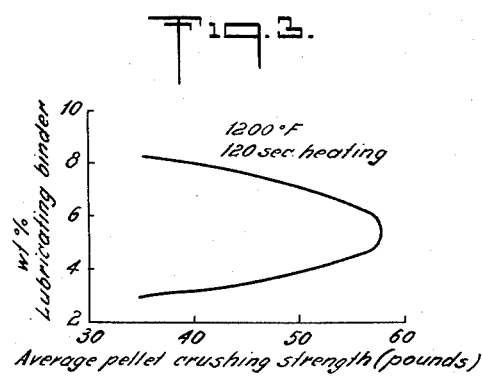

Fig. 3 shows the critical effect of the proportion of lubricant used in the agglomerating of fine alumino-silicate particles on the average pellet crushing strength. Here sodium calcium alumino-silicate immersed in molten solder for 120 seconds at 1200° F. shows a maximum crushing strength at about 5% of the fatty acid glyceride compounded with the fine particles, with average crushing strength diminishing rapidly when the proportion of lubricant is below 3% and above 8%.

The lubricating binder for my use is advantageously a high molecular weight fatty or unsaturated acid glyceride, e.g. Sterotex (which appears to be a technical grade of 2-stearyl dipalmitin), glycerol stearate, glycerol oleate, glycerol tripalmitate, glycerol monolaurate and glycerol trimyristate, and the like. These can be pure or simply a technical grade commonly sold. Preferably the lubricant is a high molecular weight fatty acid glyceride, e.g. "Sterotex" or glycerol monostearate. The average crushing strength of $5/32"$ diameter x $5/32"$ high pellets compounded of Linde 5A Molecular Sieve powder and 5% of the preferred type of lubricating binder is plotted by curve X in Figure 5 as a percentage of the average crushing strength of similar pellets untreated with lubricating binder or molten metal heating. Also plotted the same way are the average crushing strengths of similar pellets compounded with 5% calcium stearate (curve Y) and 5% stearic acid (curve Z). For these tests the pellets represented by curves were heated for 120 seconds in molten solder. In each case the pellet formed by the binder was superior in average crushing strength to a similar untreated pellet at heating temperature of 1200° F., and the glyceride and calcium stearate binders showed significant and superior average crushing strengths over the untreated pellets as the temperature used for heat treating was raised.

Generally, for a given temperature of heat treating medium I have found that the average crushing strength of the pellets increases with the time of contact in the range up to about 60 seconds. Fig. 1 is a plot of certain experimental observations of temperature of the heating medium (molten solder bath) against average pellet crushing strength in pounds for various times of contact. The batches of pellets tested herein, each pellet being essentially $5/32"$ diameter and $5/32"$ high, were compounded from 95% by weight fine 5A Molecular Sieve particles and 5% by weight Sterotex.

Figure 2:
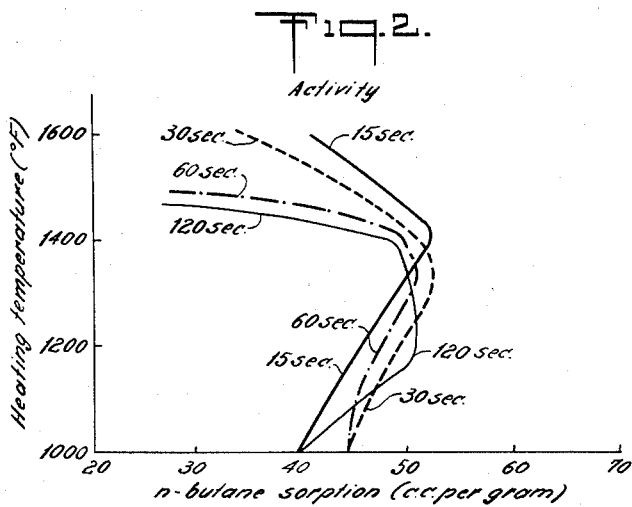

Fig. 2 is a plot of experimental observations of temperature of the heating medium against sorptive capacity for normal butane of the treated pellets for various times from 15 to 120 seconds. It will be noted from this plot that; the optimum temperature for paraffin sorptive capacity lies between generally 1200° F. and 1450° F.; that, using contact times as long as 120 seconds, the n-paraffin sorptive capacity begins to drop off badly above 1400°–1450° F.; and that with shorter times, e.g. 15 seconds, the higher temperatures can be tolerated without too badly affecting the n-paraffin sorptive capacity. The pellets used in these tests were from the same batches used in the tests plotted in Fig. 1.

Average crushing strength in all cases was determined by taking 10 pellets from a batch and crushing them individually in conventional catalyst testing machinery. Average crushing strength of the pelleted but otherwise untreated particles was only 7 pounds, and their n-butane sorption was about 40.5 cc. per gram. The n-butane sorption in all cases was measured at room temperature and pressure.

The following examples show various ways in which my invention has been evaluated, but should not be construed as limiting the invention. The pellets made in all cases were cylindrical and formed by pressure in a conventional machine to be $5/32"$ diameter and $5/32"$ high. Unless otherwise indicated, all temperatures mentioned are in degrees Fahrenheit, all parts are parts by weight, and all percentages are weight percentages. Average crushing strength and vapor sorption capacities were determined as previously described.

Example 1: 95 parts of finely divided Linde 5A Molecular Sieve particles were thoroughly and intimately mixed with 5 parts of Sterotex, pelleted, and the pellets set on a screen. Molten aluminum at 1300° F. was poured over the pellets, the time of contact at temperature above 1000° F. being estimated at about 5–10 seconds. The resulting pellets had average crushing strength of 40 pounds. After conditioning by calcining in air they had n-butane sorption of 48.5 cc. per gram, and isobutane sorption of 7 cc. per gram. Fine Linde 5A particles pelleted in the same way, but without the lubricating binder and not treated with molten metal, had average crushing strength of 7 pounds, n-butane sorption of 40.5, and isobutane sorption of 4 cc. per gram.

Example 2: A number of batches of pellets formed from 95 parts of fine Linde 5A Molecular Sieve powder and 5 parts of Sterotex were placed successively in a stainless steel tube which was perforated around and at the bottom, a particular batch of pellets being held at the base of the perforated tube with a plate to prevent them from floating out of contact with liquid solder when the batch was immersed therein. The perforated tube end containing the batch of pellets was immersed in and withdrawn from molten 50/50 tin-lead solder for contact times from 15 to 120 seconds using solder temperatures from 1000° to 1600° F. The so-treated batches of pellets were tested for crushing strength, and, after conditioning by calcining, n-butane sorption, and in a number of instances, isobutane sorption (to determine if selectivity of the pellets for sorption of straight chain hydrocarbons to the substantial exclusion of non-straight chain hydrocarbons had been impaired). The results of the average crushing strength and n-butane sorption tests are plotted in Figures 1 and 2, hereinbefore discussed. Isobutane sorption of the particles in various tests averaged about 4.5 cc. per gram (at room temperature and pressure as compared to 4 for the untreated reference pellets). The higher test values for the isobutane sorption were 8.55 (for 15 second immersion at 1600° F.) and 7 (for 120 second immersion at 1300° F.) In some cases it was surprisingly low, e.g. 1.9 for 15 second immersion at 1100° F. and 2.3 for 30 second immersion at 1300° F.

Example 3: A batch of pellets, formed from Linde 5A Molecular Sieve powder and Sterotex in the manner of Example 2 and stabilized by immersion in molten solder for one minute at 1400° F. and subsequently calcined in air, were soaked in an aqueous 10% (by volume) alcohol solution, whereby some of the liquid was sorbed by the pellets. The moist pellets were then separated and dried, and it was found that the pellet strength had not been affected noticeably. By way of contrast, similar pellets which were simply calcined in air at 1000° F. lost a great deal of their strength after soaking in water.

Example 4: A batch of pellets were made up with 95 parts Linde 5A Molecular Sieve powder and 5 parts glycerol monostearate. A part of the batch was heat treated by immersion in molten solder for 2 minutes at 1200° F., another part for 2 minutes at 1300° F., and a third part for 2 minutes at 1400° F. The batches were calcined in air to remove the stearate. Still another part was simply calcined in air at 1000° F. Test results are shown below:

| Temperature, °F. | Crushing Strength, lbs. | n-Butane sorption, cc. per gr. |
|---|---|---|
| 1,200 immersed in solder | 39 | 52 |
| 1,300 immersed in solder | 35 | 47 |
| 1,400 immersed in solder | 44 | 41.5 |
| 1,000 (calcined only) | 19 | 46.5 |

Example 5: Batches of pellets were made of various powdered alumino-silicate particles and 5% Sterotex. The pellets made were very weak, exhibiting low crushing strengths. After immersion in molten solder for one minute at 1400° F., then calcining in air at 1000° F., the following improvements were noted:

| Type of Alumino-Silicate | Crushing Strength, pounds |
|---|---|
| $(0.92K_2, 0.08Na_2)O \cdot Al_2O_3 \cdot 2SiO_2 \cdot 4\text{-}5H_2O$ (3 A. effective pore diameter) | 21 |
| $(0.82 Ca, 0.18Na_2)O \cdot Al_2O_3 \cdot 2SiO_2 \cdot 4\text{-}5H_2O$ (10 A. effective pore diameter) | 36 |
| Strontium alumino-silicate (5 A. effective pore diameter) | 15 |
| Zinc alumino-silicate (5 A. effective pore diameter) | 19 |
| $Na_2O \cdot Al_2O_3 \cdot 2SiO_2 \cdot 4\text{-}5H_2O$ (13 A. effective pore diameter) | 19 |

Example 6: A mixture of finely divided Linde 5A Molecular Sieve powder and 5% Sterotex was pelleted, and the pellets broken up to form 60–200 mesh size particles which were chalky and tended to crumble easily when rubbed together in the palm of the hand. The 60–200 mesh particles were then treated with molten solder at 1200° F. for about 20 seconds and so converted into strong, hard, abrasion-resisting particles suitable for sorption of straight chain hydrocarbons.

Obviously, many modifications and variations of the invention, as hereinbefore set forth, may be made without departing from the spirit and scope thereof, and therefore only such limitations should be imposed as are indicated in the appended claims.

I claim:

1. A process for stabilizing a sorptive crystalline alumino-silicate zeolite particle, said zeolite having substantially uniform effective pore diameter between about 3 and about 13 Angstrom units, which comprises contacting said particle for a period of time between about 2 and about 200 seconds with a molten metal heating medium having a melting point lower than said zeolite particle and maintained in the range of about 1000° to about 1700° F., the relationship between said time and said temperature being substantially inverse, and thereafter recovering from the molten metal said particle having increased durability and no substantial impairment of sorptive activity.

2. The process of claim 1 wherein the time of contact used is in the range defined by a minimum of about 10 seconds and a maximum of about 200 seconds for a heating medium temperature of 1000° F., and between a minimum of about 2 seconds and a maximum of about 30 seconds for a heating medium temperature of 1600° F.

3. The process of claim 1 wherein the temperature is regulated between 1200° and 1400° F., and the time of contact is maintained substantially inversely proportional to said regulated temperature and is between about 120 seconds at 1200° F. and about 15 seconds at 1400° F.

4. The process of claim 1 wherein said alumino-silicate particle is a mineral sorbent selective for straight chain hydrocarbons to the substantial exclusion of non-straight chain hydrocarbons in a mixture thereof.

5. The process of claim 1 wherein the heating medium is selected from the group consisting of aluminum, tin, lead, cadmium, zinc, 70–30 magnalium, woods metal, tin-lead solder, rose metal, gallium, mercury, and white metal.

6. A process for stabilizing sorptive crystalline alumino-silicate zeolite particles, said zeolite having substantially uniform effective pore diameter between about 3 and about 13 Angstrom units, which comprises forming a mixture of 3–8 weight percent of lubricating binder and 97–92 weight percent of fine particles of said zeolite, forming at least a portion of said mixture into a particle substantially larger in size than the original fine particles, contacting said larger particle for a period of time between about 2 and about 200 seconds with a molten metal heating medium having a melting point lower than said zeolite particles and being maintained in the range of about 1000° F. to about 1700° F., the relationship between said time and said temperature being substantially inverse, and thereafter recovering said larger particle.

7. The process of claim 6 wherein said mixture is about 5% binder and 95% fine particles.

8. The process of claim 6 wherein the lubricating binder is a high molecular weight fatty acid glyceride.

9. The process of claim 6 wherein said heating medium is a tin-lead solder.

10. The process of claim 6 wherein said heating medium is woods metal.

11. The process of claim 6 wherein said heating medium is lead.

12. The process of claim 6 wherein said heating medium is zinc.

13. The process of claim 6 wherein said heating medium is aluminum.

14. A stabilized crystalline alumino-silicate zeolite particle having substantially uniform effective pore diameter between about 3 and about 13 Angstrom units and comprising the dense agglomerate produced by the process which comprises mixing fine particles of said zeolite with 3–8% lubricating binder, forming at least a portion of the resulting mixture into a larger particle, contacting said larger particle for a period of time between about 2 and about 200 seconds with a molten metal heating medium having a melting point lower than the zeolite particles and being maintained in the range of about 1000° to about 1700° F., the relationship between said time and said temperature being substantially inverse, and thereafter recovering said larger particle of increased durability and no substantial impairment of sorptive activity.

References Cited in the file of this patent

UNITED STATES PATENTS

| | | |
|---|---|---|
| 2,446,784 | Daley et al. | Aug. 10, 1948 |
| 2,500,801 | Church | Mar. 14, 1950 |
| 2,509,014 | Payne et al. | May 23, 1950 |
| 2,606,159 | Owen | Aug. 5, 1952 |
| 2,859,257 | Hess et al. | Nov. 4, 1958 |

FOREIGN PATENTS

| | | |
|---|---|---|
| 4,372 | Great Britain | of 1874 |

UNITED STATES PATENT OFFICE
CERTIFICATE OF CORRECTION

Patent No. 2,947,709                 August 2, 1960

Watson A. Ray

It is hereby certified that error appears in the printed specification of the above numbered patent requiring correction and that the said Letters Patent should read as corrected below.

Column 2, line 68, for "above" read -- about --.

Signed and sealed this 10th day of January 1961.

(SEAL)
Attest:

KARL H. AXLINE
Attesting Officer

ROBERT C. WATSON
Commissioner of Patents